US007201486B2

(12) United States Patent
Sugiyama

(10) Patent No.: US 7,201,486 B2
(45) Date of Patent: Apr. 10, 2007

(54) REFLECTING MIRROR SUPPORT STRUCTURE AND ADJUSTING METHOD THEREFOR

(75) Inventor: Ryuichi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 225 days.

(21) Appl. No.: 10/469,251

(22) PCT Filed: Dec. 28, 2001

(86) PCT No.: PCT/JP01/11658

§ 371 (c)(1),
(2), (4) Date: Aug. 28, 2003

(87) PCT Pub. No.: WO03/061071

PCT Pub. Date: Jul. 24, 2003

(65) Prior Publication Data

US 2004/0085255 A1 May 6, 2004

(51) Int. Cl.
*G02B 7/182* (2006.01)

(52) U.S. Cl. ...................... 359/871; 359/849; 359/855; 359/900

(58) Field of Classification Search ................ 359/850, 359/865, 871, 872, 867, 881, 855; 248/476, 248/477, 479, 485, 487, 495, 497; 343/915
See application file for complete search history.

(56) References Cited

U.S. PATENT DOCUMENTS 2,639,426 A * 5/1953 McAuley et al. .............. 342/8
3,401,390 A 9/1968 Braccini et al.
4,632,523 A 12/1986 Knohl
4,750,002 A 6/1988 Kommineni
4,906,087 A * 3/1990 Ealey et al. ................ 359/849
5,035,497 A 7/1991 Itoh
5,831,780 A 11/1998 Krim
5,941,497 A 8/1999 Inoue et al.
6,293,682 B1 9/2001 Kawaguchi

FOREIGN PATENT DOCUMENTS

JP 57-112104 7/1982
JP 2001-296466 10/2001
WO WO 00/17955 3/2000

* cited by examiner

*Primary Examiner*—James Phan
(74) *Attorney, Agent, or Firm*—Oblon, Spivak, McClelland, Maier & Neustadt, P.C.

(57) ABSTRACT

A reflecting mirror support mechanism has at least one reflecting mirror panel (1), a support base (3) to finally support the reflecting mirror panel (1), and at least one reflecting mirror support member (2). The reflecting mirror support member (2) has a structure in which a base section (2A) is mounted on the support base (3) and plural branch sections (2B) are mounted to the reflecting mirror panel (1).

14 Claims, 10 Drawing Sheets

REFLECTING MIRROR SUPPORT STRUCTURE AND ADJUSTING METHOD THEREFOR

TECHNICAL FIELD

The present invention relates to a reflecting mirror support mechanism and an adjusting method thereof for use in a field of radio telescopes having a main mirror with high mirror surface accuracy, for example.

BACKGROUND ART

There is a strong requirement, in the field of radio telescope for use in astronomical observation, to use a support mechanism for reflecting mirrors which can achieve and maintain a high mirror surface accuracy.

FIG. 10 is a perspective view showing an example of a conventional reflecting mirror support mechanism. In FIG. 10, reference character 1*a* designates a plurality of reflecting mirror panels, 2*a* denotes reflecting mirror support members, and 3*a* indicates a support base. Each reflecting mirror panel 1*a* is made and finished so as to have a very high mirror surface accuracy. A plurality of the reflecting mirror panels 1*a* that are arranged form one reflecting mirror. For example, in a radio telescope for use in astronomical observation a shape of the surface of each reflecting mirror panel 1*a* is finished so that the main mirror made up of a plurality of the reflecting mirror panels 1*a* has a desired shape such as a paraboloid of revolution so as to reflect a weak radio efficiently and converg it to the focus of the main mirror.

One reflecting mirror panel 1*a* is supported by the upper section of each of the three reflecting mirror support members 2*a*. The lower section of each member 2*a* is supported by the support base 3*a*. The support base 3*a* is made up of a sandwich panel of a CFRP (Carbon-Fiber Reinforced Plastic) with high rigidity, for example.

The conventional support mechanism shown in FIG. 10 uses a well-known three-point support. This mechanism is excellent in structural stability of the reflecting panel 1*a*. However, because the number of the reflecting mirror support members 2*a* that support each reflecting mirror panel 1*a* is small, it is very difficult to perform fine adjustment for the reflecting mirror panels 1*a* in a desired shape. For example, although the shape of the surface of each reflection mirror panel 1*a* is made with high accuracy in the field of the radio telescopes for astronomical observation, there happens a necessity to further perform a fine adjustment of the shape of the surface of the reflecting mirror panels 1*a*, and the fine adjustment is performed in height and support angle of each reflecting mirror support member 2*a*. However, the actual shape of the surface of each reflecting mirror panel 1*a* is different from an ideal shape thereof even if the fine adjustment is performed based on the structure where each reflecting mirror panel 1*a* is supported only by the three supporting points. As a result, there is a possibility that the accuracy of the main mirror as an assembled structure body becomes inferior.

Because the main mirror of a radio telescope for use in astronomical observation has an allowable shape error of not less than several μm, it is necessary to prepare a plurality of small-sized reflecting mirror panels 1*a* and a plurality of reflecting mirror support members 2*a* supporting the panels 1*a*. The panels 1*a* and the members 2*a* form the main mirror. In addition to or instead of them, it is further necessary to finish the shape of the surface of each reflecting mirror panel 1*a* with excellent accuracy. For this reason, the working cost to prepare all the reflecting mirror panels 1*a* is increased and the work load of the fine adjustment for them is also increased.

FIG. 11 is a perspective view of another example of the conventional reflecting mirror support mechanism. For example, the patent document U.S. Pat. No. 4,750,002 has disclosed such a technique. In FIG. 11, reference character 1*b* designates reflecting mirror panels, 2*b* denotes reflecting mirror support members, and 3*b* indicates a support base. It is so made that each reflecting mirror panel 1*b* has an excellent mirror surface accuracy. A plurality of the reflecting mirror panels 1*b* which are arranged form one reflecting mirror.

One reflecting mirror panel 1*b* is supported by the upper section of each of the reflecting mirror support members 2*b* of more than three. The support base 3*b* supports the lower sections of the reflecting mirror support members 2*b*. The support base 3*b* is made up of a sandwich panel of a CFRP (Carbon-Fiber Reinforced Plastic) with high rigidity, for example.

In the support mechanism shown in FIG. 11, because each reflecting mirror panel 1*b* is supported by at least four supporting points, it is possible to easily perform the fine adjustment for the shape of the reflecting mirror panels 1*b* so that the entire shape of the main mirror becomes an approximately desired shape. However, in a case to use each reflecting mirror panel 1*b* of a large size it is necessary to greatly increase the number of the supporting points by which each reflecting mirror 1*b* is supported in order to perform the fine adjustment of the shape of each reflecting mirror panel 1*b*. This causes several problems to increase the workload for the fine adjustment of the panels 1*b* and the entire cost of the reflecting mirror because the number of the plural reflecting mirror support members 2*a* becomes many and the number of the supporting points where the members 2*b* are mounted on the support base 3*b* is also increased.

Because the support mechanism shown in FIG. 11 has the structure described above, there is a possibility to happen in each panel 1*b* a strain caused by a fixture error of each reflecting mirror panel to the support base 3*b*, a strain caused by a wind load, and a heat strain by a temperature difference between the panels 1*b*. Further, there is a possibility that those strains cause unexpected deformation between the reflecting mirror panels 1*b*.

The present invention has been accomplished in order to solve the aforementioned conventional problems.

An object of the present invention is to provide a reflecting mirror support mechanism capable of supporting the shape of reflecting mirror panels with high structural stability and high accuracy and performing a fine adjustment for the shape of the reflecting mirror panels with high accuracy by low work load. The object of the present invention is also to provide an adjusting method capable of adjusting the reflecting mirror support mechanism efficiently.

DISCLOSURE OF INVENTION

In accordance with an aspect of the present invention, there is a provided a reflecting mirror support mechanism has at least one reflecting mirror, a support base for supporting the reflecting mirror, and at least one reflecting mirror support member placed between the reflecting mirror panel and the support base. The reflecting mirror support member supports the reflecting mirror panel and is made up of a base section mounted on the support base and a plurality of branch sections mounted on the reflecting mirror panel.

Thereby, one base section of the reflecting mirror support member is mounted to the support base and the plural branch sections are mounted to the reflecting mirror panel. It is possible to maintain the reflecting mirror panels with high structural stability and the shape of the reflecting mirror panels with high accuracy by mounting the plural branch sections to support one reflecting mirror. Further, although there are the plural branch sections, it is possible to perform a fine adjustment of the shape of the reflecting mirror panel with simple adjusting work because the reflecting mirror support member has a single base section.

According to another aspect of the present invention, the number of the branch sections of the reflecting mirror support members is three. Thereby, the reflecting mirror panel is supported at the three supporting positions in one reflecting mirror support member. This increases the structural stability of the reflecting mirror support mechanism.

According to another aspect of the present invention, one reflecting mirror panel is supported by the three reflecting mirror support members. Thereby, the reflecting mirror panel is supported by the plural branch sections. This increases the shape accuracy of the reflecting mirror panel easily and it is also possible to perform a fine adjustment of the reflecting mirror panel with high accuracy. When considered from another standpoint, even if a size of the reflecting mirror panel becomes large, it is possible to maintain the accuracy of the shape. On the other hand, the branch section is finally supported by each base section of the three reflecting mirror support members. Accordingly, because the entire load of the panel is finally supported at the three supporting positions, it is possible to provide the stable structure of the reflecting mirror support mechanism without collapse.

According to another aspect of the present invention, a first position adjusting mechanism for adjusting to the support base a position of a group of the branch sections in the reflecting mirror support member is formed on the base section of the reflecting mirror support member or the support base. A plurality of second position adjusting mechanism for adjusting a mount position of each branch section to the reflecting mirror panel are formed in each of a plurality of the branch sections of the reflecting mirror support member or the reflecting mirror panel.

Thereby, by using the first position adjusting mechanism mounted on the base section or the support base, it is possible to roughly adjust a group of the branch sections to the support base collectively. This contributes the adjustment of a rough position and the shape of the reflecting mirror panel. Further, by using the second position adjusting mechanism mounted on each branch section or the reflecting mirror panel, it is possible to perform the fine adjustment for the mount position of each branch section corresponding to the reflecting mirror panel. This contributes the fine adjustment of the shape of the reflecting mirror panel. By performing two stage adjustment operations, it is possible to increase the entire of the work efficiency.

According to another aspect of the present invention, a displacement allowable mechanism which allows a displacement of the reflecting mirror panel according to an external force applied after placement is formed in the reflecting mirror support member. Thereby, even if a mount error, a strain caused by a wind load to each panel, and a thermal strain caused by a temperature difference between the panels occur, it is possible to suppress any increasing of the strain because the shape of each reflecting mirror panel is changed according to the amount of the strains.

According to another aspect of the present invention, the displacement allowable mechanism has a first displacement allowable member and a plurality of second displacement allowable members. The first displacement allowable member is mounted on the base section of the reflecting mirror support member so as to allow the displacement of a group of the branch sections of the reflecting mirror support member to the support base according to the external force. The second displacement allowable member is mounted on each of a plurality of the branch sections of the reflecting mirror support member so as to allow the displacement of the mount position of each branch section to the reflecting mirror panel according to the external force.

Thereby, even if a wide and large strain occurs in the reflecting mirror panel occurs, it is possible for the first displacement allowable member mounted on the base section to collectively change the group of the branch sections to the support base. Further, by the second displacement allowable section, it is possible to change the mount position of each branch section corresponding to the reflecting mirror panel. That is, the second displacement allowable member is effective for adjusting a localized displacement.

According to another aspect of the present invention, each of the first and second displacement allowable members has a universal joint. Thereby, it is possible that the group of the branch sections is tilted toward the direction of a wide range to the support base by the first displacement allowable member. Further, each mount position in each branch section to the reflecting mirror panel is shifted toward the direction of the wide range by the second displacement allowable member.

According to another aspect of the present invention, the reflecting mirror support member has a plurality of first branch sections branched from the base section and a plurality of second branch sections branched from each first branch section. Each second branch section supports a upper load including a load of the reflecting mirror panel.

Thereby, it is possible for the plural branch sections to easily support the reflecting mirror panel, and possible to easily increase the shape accuracy of the reflecting mirror panel, and to perform the fine adjustment for the shape of the reflecting mirror panel with high accuracy. In addition, because the reflecting mirror support member has the single base section, but has the plural branch sections, it is possible to perform the fine adjustment for the shape of the reflecting mirror panel with high accuracy and to decrease the amount of the adjustment work load.

According to another aspect of the present invention, the number of the first branch sections is three, and the number of the second branch sections branched from each first branch section is three. Thereby, it is possible to increase the structural stability because the upper load including the load of the reflecting mirror panel is supported by the three supporting points, that is, by the three second branch sections per one first branch section. On the other hand, the plural second branch sections are supported by the three first branch sections. Accordingly, the entire load of the upper section of the base section is supported by the three supporting points. It is thereby possible to provide the stable structure of the reflecting mirror support mechanism with less collapse.

According to another aspect of the present invention, a first position adjusting mechanism for adjusting to the support base a position of a group of the branch sections in the reflecting mirror support member is formed in the base section of the reflecting mirror support member or the support base. A plurality of second position adjusting mechanism for adjusting a mount position of each of the reflecting mirror support member and the reflecting mirror panel is formed in at least one of a plurality of the first branch sections of the reflecting mirror support member and a plurality of the second branch sections and the reflecting mirror panel.

Thereby, it is possible to roughly and collectively adjust the position of the group of the branch sections to the support base by the first position adjusting mechanism mounted on the base section or the support base. Further, it is possible to perform the fine adjustment for the mount position of the reflecting mirror support members to the reflecting mirror panel by using the second position adjusting mechanism. By performing the step-by-step adjustments described above, it is possible to increase the efficiency of the total adjusting work.

According to another aspect of the present invention, a base section displacement allowable member to allow a displacement of a group of the branch sections of the reflecting mirror support member to the support base according to an external force is formed in the base section of the reflecting mirror support member. A branch section displacement allowable member to allow a displacement of a mount position to a upper configuration element of each branch section is formed in each of a plurality of the branch sections of the reflecting mirror support member.

Thereby, even if a large strain of a wide range occurs in the reflecting mirror panel, it is possible to collectively change the position of the group of the branch sections to the support base by the base section displacement allowable member. Further, it is also possible to displace each corresponding branch section independently by the branch section displacement allowable member mounted in each branch section. That is, the branch section displacement allowable member is effective for a local displacement of the reflecting mirror panel.

According to another aspect of the present invention, an adjusting method of adjusting the reflecting mirror support mechanism has following steps: fixing a plurality of operation devices to operate a first position adjustment mechanism and a second position adjustment mechanism in the reflecting mirror support mechanism by a mounting mechanism, adjusting a position of a reflecting mirror support member and a mount position of each branch section to the reflecting mirror panel by operating the first and second position adjusting mechanism by driving each operation device, and removing the operation devices from the reflecting mirror support mechanism by detaching the mount mechanism.

Thereby, because the plural operation devices are fixed to the reflecting mirror support structure by the plural mount mechanism, it is possible to easily operate the first and second position adjusting mechanisms. This can achieve the efficient adjustment for the reflecting mirror panels. In addition, because the mount mechanism is released and finally detached from the reflecting mirror support structure, it is possible to remove the load applied to the reflecting mirror support mechanism and to increase the durable life thereof.

According to another aspect of the present invention, the operation of each operation device is automatically initiated by receiving an operation instruction signal of an electromagnetic wave transmitted from a remote controller. Thereby, it is not necessary to incorporate any wire through which the instruction signal to operate the operation devices is transferred. This can decrease the load applied to the reflecting mirror support structure.

According to another aspect of the present invention, the operation instruction signal indicates an amount of the operation to the first and second position adjusting mechanisms, and one of the first and second position adjusting mechanisms is driven according to the amount of the instructed operation by each operation device. Thus, the operation devices can operate automatically, and it is thereby possible to perform the adjustment operation with extreme efficiency.

According to another aspect of the present invention, an adjusting method of adjusting the reflecting mirror support mechanism has the steps: fixing a plurality of operation devices to operate a first position adjustment mechanism and a second position adjustment mechanism to the reflecting mirror support mechanism by a mounting mechanism, adjusting a position of a reflecting mirror support member and a mount position of the reflecting mirror support member to a reflecting mirror panel by operating the first and second position adjusting mechanism by driving each operation device, and removing the operation devices from the reflecting mirror support mechanism by detaching the mount mechanism.

Thereby, because the plural operation devices are fixed to the reflecting mirror support structure by the plural mount mechanisms, it is possible to easily operate the first and second position adjusting mechanisms. This can achieve the efficient adjustment for the reflecting mirror panels. In addition, because the mount mechanism is released and finally detached from the reflecting mirror support structure, it is possible to remove the load applied to the reflecting mirror support mechanism and to thereby increase the durable life thereof.

Other objects, features and advantages of the present invention will become apparent in the following description and appended drawings.

BEST MODE FOR CARRYING OUT THE INVENTION

The best mode for carrying out the invention will now be described in detail with reference to the accompanying drawings.

First Embodiment

Figure 1:
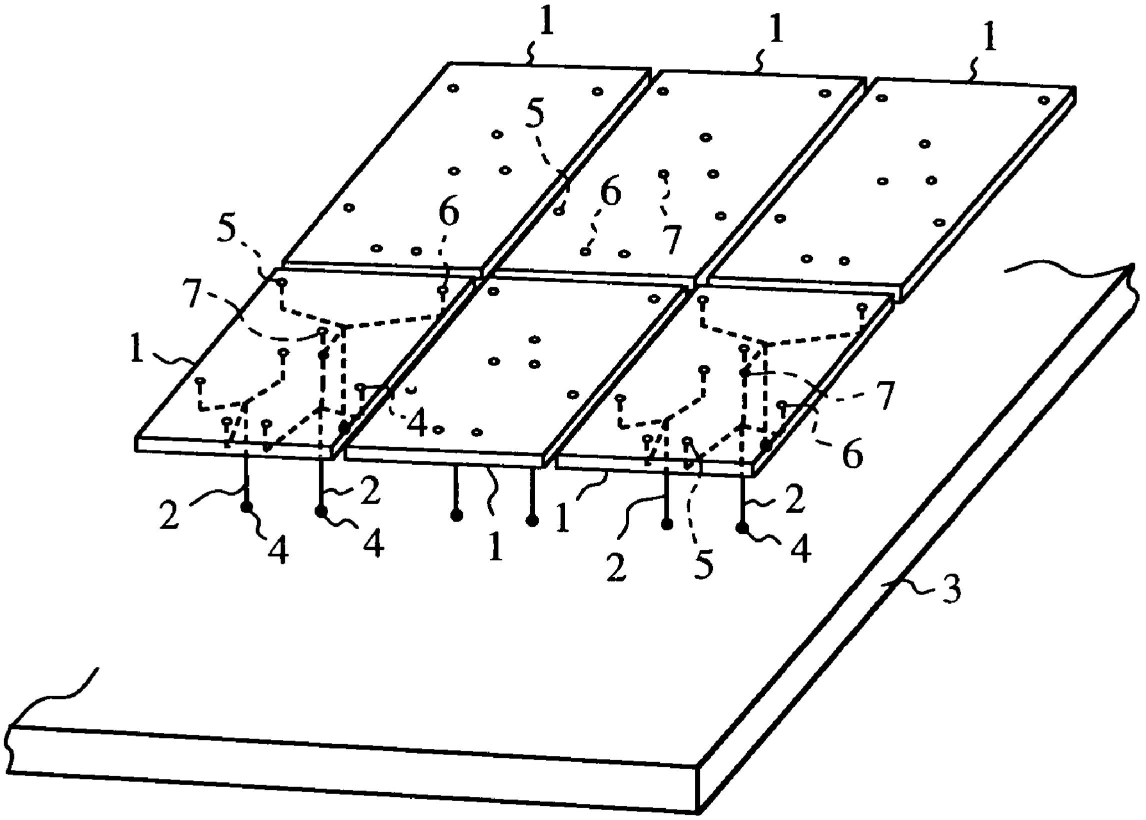
FIG. 1 is a perspective view showing the entire of a reflecting mirror support structure according to a first embodiment of the present invention.

FIG. 1 is a perspective view showing the entire of the reflecting mirror support structure according to a first embodiment of the present invention. In FIG. 1, reference number 1 designates reflecting mirror panels, 2 denotes reflecting mirror support members, 3 indicates a support base, 4 designates mount positions for the reflecting mirror support members 2 to the support base 3, and 5, 6, and 7 denote mount positions of the reflecting mirror support members 2 to the reflecting mirror panels 1.

Each reflecting mirror panel 1 is made and finished so as to have a very high mirror surface accuracy. A plurality of the reflecting mirror panels 1 that are arranged form one reflecting mirror. For example, in a radio telescope for use in astronomical observation a shape of the surface of each reflecting mirror panel 1 is finished so that the main mirror made up of a plurality of the reflecting mirror panels 1 has a desired shape such as a paraboloid of revolution so as to reflect a weak radio efficiently and converge it to the focus of the main mirror.

As described later, according to this embodiment, because a fine adjustment for the shape of each reflecting mirror panel 1 can be easily performed, it is not necessary to make the shape of each reflecting mirror panel 1 exactly. Although the outline of each reflecting mirror panel 1 shown in FIG. 1 is a rectangle shape, it is possible to make it with another shape for each purpose.

One reflecting mirror panel 1 is supported by the upper section of each of the three reflecting mirror support members 2. The lower section of each member 2 is supported by the support base 3. The support base 3 is made up of a sandwich panel with a CFRP (Carbon-Fiber Reinforced Plastic) of high rigidity, for example.

Each reflecting mirror support member 2 is branched to three sections. That is, each member 2 has the three mount supporting points 5, 6, and 7 which are mounted to the corresponding reflecting mirror panel 1. Each member 2 further has one mount position 4 in the lower section thereof, which is mounted to the support base 3. Accordingly, one reflecting mirror panel 1 supported by the three reflecting mirror support members 2 has nine mount positions. On the other hand, the support base 3 has the three support positions, that is, the three mount positions 4 per reflecting mirror panel 1. As described later, the position adjustment mechanism is formed for each mount position 5, 6, 7, and 4.

Figure 2:
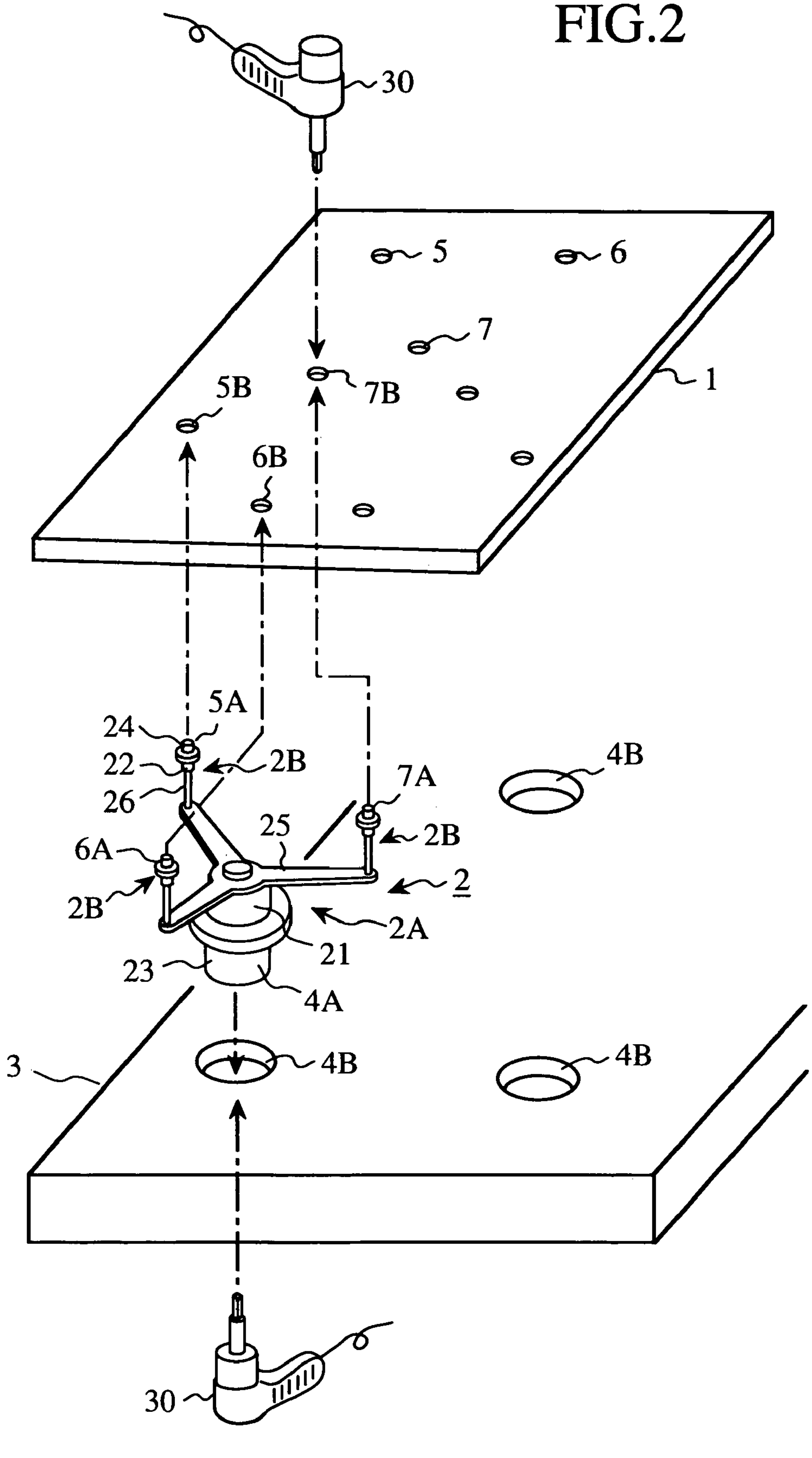
FIG. 2 is an exploded view of the reflecting mirror support structure shown in FIG. 1.

FIG. 2 is an exploded view of the reflecting mirror support structure according to the first embodiment. In FIG. 2, reference character 2A designates a base section, 2B denotes a branch section, reference number 21 designates a first displacement allowable member, 22 denotes a second displacement allowable member, 23 indicates a first position adjusting mechanism, 24 designates a second position adjusting mechanism, 25 denotes an arm base, 26 designates a lower section of the branch section 2B, and 30 denotes a tool.

As apparently shown in FIG. 2, the plate support member, namely, the reflecting mirror support member 2 has the base section 2A at the lower section thereof. The three branch sections 2B are mounted to the upper part of the base section 2A. As more concretely described, the arm base 25 having three arms is mounted on the upper part of the base section 2A. The lower section 26 of the branch section 2B is mounted on the front part of each arm in a body.

The arm base 25 is fixed to the upper part of the base section 2A so as not to rotate it. Each arm extends radially toward approximately horizontal direction from the upper part of the base section 2A.

Although the arms have a same length and placed at a same angle interval to each other (as a preferred example), it is acceptable to use arms of a different length placed at an irregular angle. Further, it is also acceptable to adjust the length of each arm and an angle interval of the arms and to fix the arms after the completion of the adjustment.

The base section 2A has the lower section 4A. The lower section 4A is inserted to a penetrate hole 4B formed in the support base 3. Thus, the lower section 4A of the base section 2A and the penetrate hole 4B of the support base 3 form the mount position 4 between the reflecting mirror support member 2 and the support base 3.

Each branch section 2B has the upper sections 5A, 6A, and 7A. The upper sections 5A, 6A, and 7A are inserted to the penetrate holes 5B, 6B, and 7B, respectively.

Thus, the upper sections 5A, 6A, and 7A of the branch sections 2B and the penetrate holes 5B, 6B, and 7B of the reflecting mirror panel 1 form the mount positions 5, 6, and 7 for the reflecting mirror support member 2 and the reflecting mirror panel 1 shown in FIG. 1.

The first displacement allowable member 21 and the first position adjusting mechanism 23 are formed in the middle of the base section 2A. The first displacement allowable member 21 is the displacement allowable member in the base section to incline the upper section thereof to the lower section 4A of the base section 2A according to the magnitude of an external force.

Thus, by inclining the upper section of the base section 2A, all the branch sections 2B are mounted to the support base 3 according to the magnitude of the external force.

The first position adjusting mechanism 23 is the position adjusting mechanism in the base section to allow the adjustment of the expansion and contraction of the base section 2A in the axis direction after the setting of the reflecting mirror support member 2. Thus, by adjusting the length of the base section 2A, it is possible to collectively adjust the positions (actually, the heights) of all the branch sections 2B to the support base 3.

On the other hand, the second displacement allowable member 22 and the second position adjusting mechanism 24 are formed in the middle of the base section 2B. The second displacement allowable member 22 is the displacement allowable member in the branch section to incline the upper sections 5A, 6A, and 7A thereof to the lower section 6A of the branch section 2B according to the magnitude of an external force.

Thus, by inclining the upper sections 5A and 6A or 7A of the branch section 2B, each of the upper sections 5A, 6A, and 7A, and the mount positions 5, 6, and 7 can change independently according to the magnitude of the external force.

The second position adjusting mechanism 24 is the position adjusting mechanism in the branch section to allow the adjustment for the expansion and contraction of the corresponding branch section 2B in the approximately vertical direction after the setting of the reflecting mirror panel 1. Thus, by adjusting the length of the branch section 2B, it is possible to adjust the positions (actually, the heights) of the upper sections 5A, 6A, and 7A and the mount positions 5, 6, and 7 of each branch section 2B to the support base 3 independently, even if the reflecting mirror support structure has been assembled.

Figure 3:
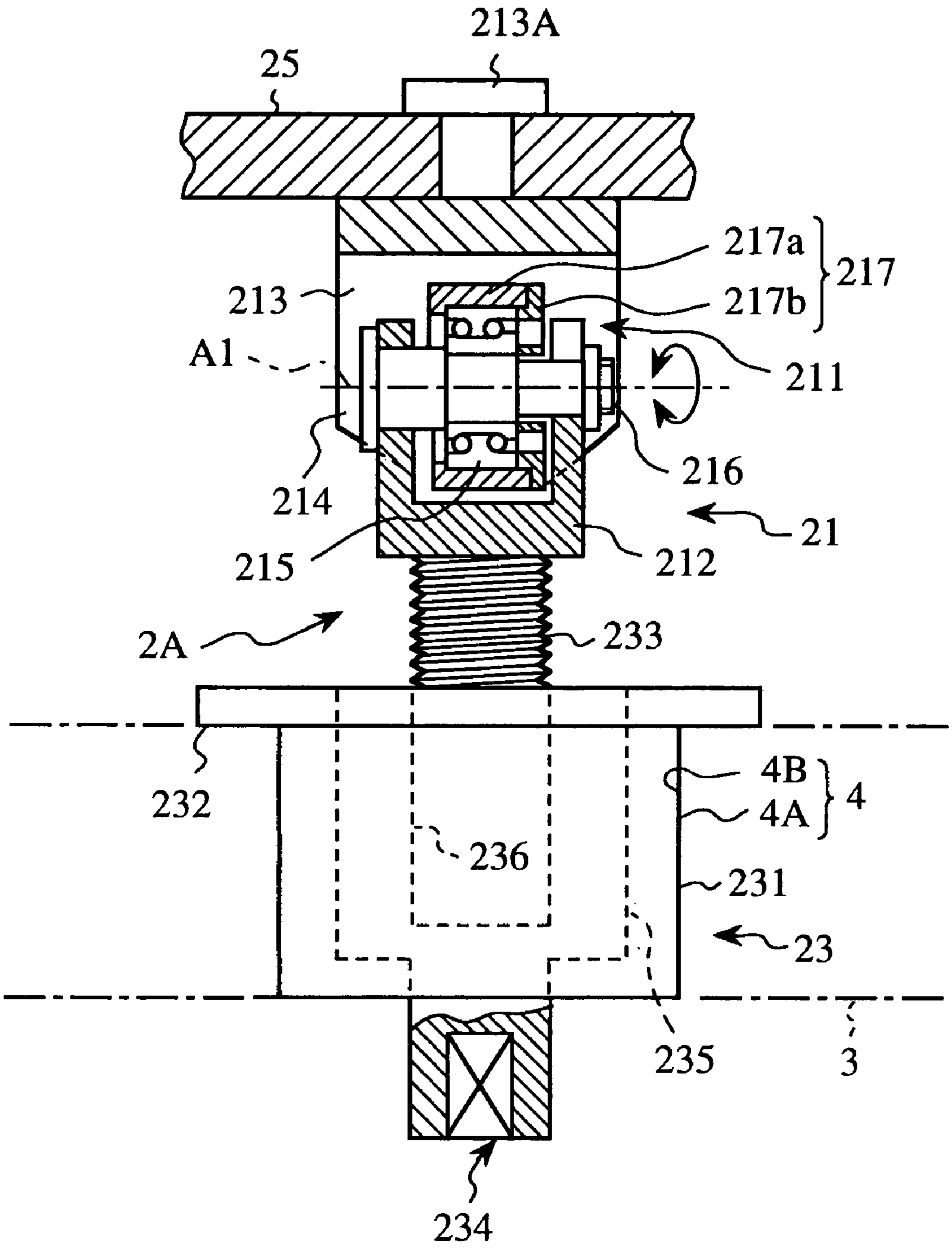
FIG. 3 is a partial front view showing a base section (a part of which is shown by dotted lines) of the reflecting mirror support structure shown in FIG. 1.

FIG. 3 shows a detailed structure of the first position adjusting mechanism 23. In FIG. 3, reference number 231 designates an anchor, 232 denotes a flange of the anchor 231, 233 indicates a main pole, 234 indicates a driving hole, 235 denotes a rotor, and 236 designates a hole formed in the rotor 235.

The first position adjusting mechanism 23 shown in FIG. 3 is capable of shifting upward and downward all the configuration elements placed at the upper side thereof collectively using the function of a screw. In a concrete example, the first position adjusting mechanism 23 (namely, the first height adjusting mechanism) has the anchor 231, the rotor 235 placed in the hole in the anchor 231, and the main pole 233 which is engaged with the rotor 235 so as to shift it upward and downward.

The anchor 231 has the lower section 4A of the reflecting mirror support member 2 inserted into the penetrate hole 4B of the support base 3 in order to fix it at the penetrate hole 4B.

The flange 232 expanded at the upper section of the anchor 231 radially acts as a stopper to prevent that the anchor 231 falls down from the support base 3. The hole is formed in the middle part of the anchor 231. The rotor 235 is placed in this hole, so that the rotor 235 can rotate about its vertically central axis. The rotor 235 has the internal hole 236 formed in its vertical direction. A female screw is formed at the inner surface of the internal hole 236. A male screw is formed at the outer surface of the main pole 233. The main pole 233 is engaged with the inner hole 236 of the rotor 235 by those screws. By rotating the rotor 235 against the anchor 231 about the common axis in the vertical direction of the main pole 233 and the rotor 235, the main pole 233 can be moved upward and downward.

The lower section of the rotor 235 projects from the anchor 231 and the support base 3 toward the downward. The driving hole 234 is formed at the lower part of the rotor 235.

The tool 30 shown in FIG. 2 is inserted into the driving hole 234 in order to rotate the main pole 233 about its axis.

For example, the tool 30 is an electric screw driver. The chip of the electric screw drive is engaged with the driving hole 234. An operator can adjust the height of all of te configuration elements in the upper section of the first position adjusting mechanism 23 using the tool 30.

Figure 4:
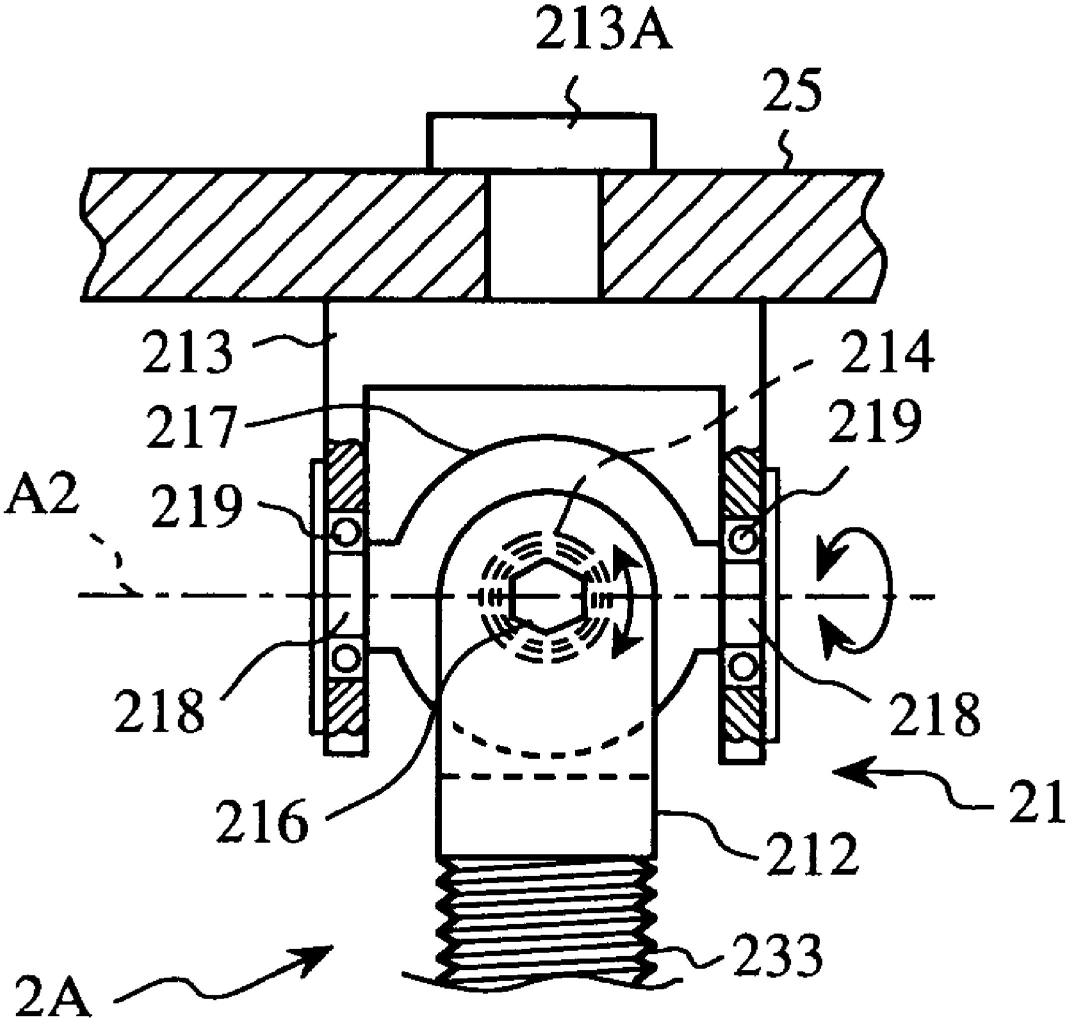
FIG. 4 is a side view of the structure shown in FIG. 3.

FIG. 3 and FIG. 4 show the first displacement allowable member 21 in detail. In FIG. 3 and FIG. 4, reference number 211 designates a universal joint, 212 denotes a first bracket, and 213 indicates a second bracket. Reference character 213A designates a fixing pin, reference number 214 indicates a first axis, 215 denotes a first bearing, 216 designates an axis fixing bolt, and 217 denotes a bearing case assembly. Reference characters 217*a* and 217*b* designate case members, reference number 218 indicates a second axis, and 219 denotes a second bearing.

The first displacement allowable member 21 shown in FIG. 3 and FIG. 4 allows to incline the upper part (the second bracket 213) to the lower part 4A of the base section 2A according to the magnitude of an external force using the action of the universal joint 211 after the reflecting mirror support member 2 is set. In a concrete example, the first displacement allowable member 21 has the universal joint 211, and both the brackets 212 and 213 mounted on the universal joint 211.

The first bracket 212 placed at the lower section of the universal joint 211 is placed at the upper section of the main pole 233 of the first position adjusting mechanism 23. As shown in FIG. 3, the first bracket 212 has a top plate and two side plates. The top plate is placed at the upper side of the main pole 233 and the side plates extend from this top plate toward the upper side. The top plate and the side plates are assembled in one body.

The side plates of the first bracket 212 are engaged with the first axis 214. One end of the first axis 214 has a flange and other end thereof has a male screw (not shown). The flange is placed outside of one side plate, and is inserted into a hole formed in both the side plates, and the axis fixing bolt 216 is engaged with the male screw. By this manner, the first axis 214 is fixed to the first bracket 212 so as not to rotate them together.

The middle part of the first axis 214 is inserted to the first bearing 215, and the first bearing 215 rotates to the fixed first axis 214. The first bearing 215 is accommodated in the bearing case assembly 217 made up of the case members 217*a* and 217*b*, and fixed to the bearing case assembly 217. Accordingly, the first bearing 215 and the bearing case assembly 217 can rotate about the central axis line A1 of the first axis 214 to the fixed first axis 214.

As shown in FIG. 4, a pair of the second axes 218 is extended from both the sides of the bearing case assembly 217 toward outside. The second axis 218 is fixed to the bearing case assembly 217 or is made in one body. Those second axes 218 have a common central axis line A2. The direction (see FIG. 3) toward which the central axis line A2 is extended is intersected at right angles.

The second bracket 213 placed at the upper side of the universal joint 211 is placed in the lower side of the arm base 25. The second bracket 213 has the top plate and the side plates. The top plate is placed at the bottom surface of the arm base 25 and the side plates extend from both sides of the top plate toward the lower direction. The top plate and the side plates are assembled in one body.

The second bearing 219 is mounted to each side plate of the second bracket 213. The second axis 218 of the bearing case assembly 217 described above is supported rotatably by the second bearing 219. Accordingly, the second bearing 219 and the second bracket 213 can rotate about the central axis line A2 of the second axis 218.

As apparently understood by the above explanation, the first axis 214, the first bearing 215, the bearing case assembly 217, the second axis 218, and the second bearing 219 form the universal joint 211.

The second bracket 213 and the arm base 25 can incline in all directions by using the universal joint 211. The person having the skill in this technical field can understand that the universal joint 211 is one variation of the hook joint.

As not shown, it is preferred to have a mechanism to suppress an excessively relative rotation between the configuration elements forming the universal joint 211.

Figure 5:
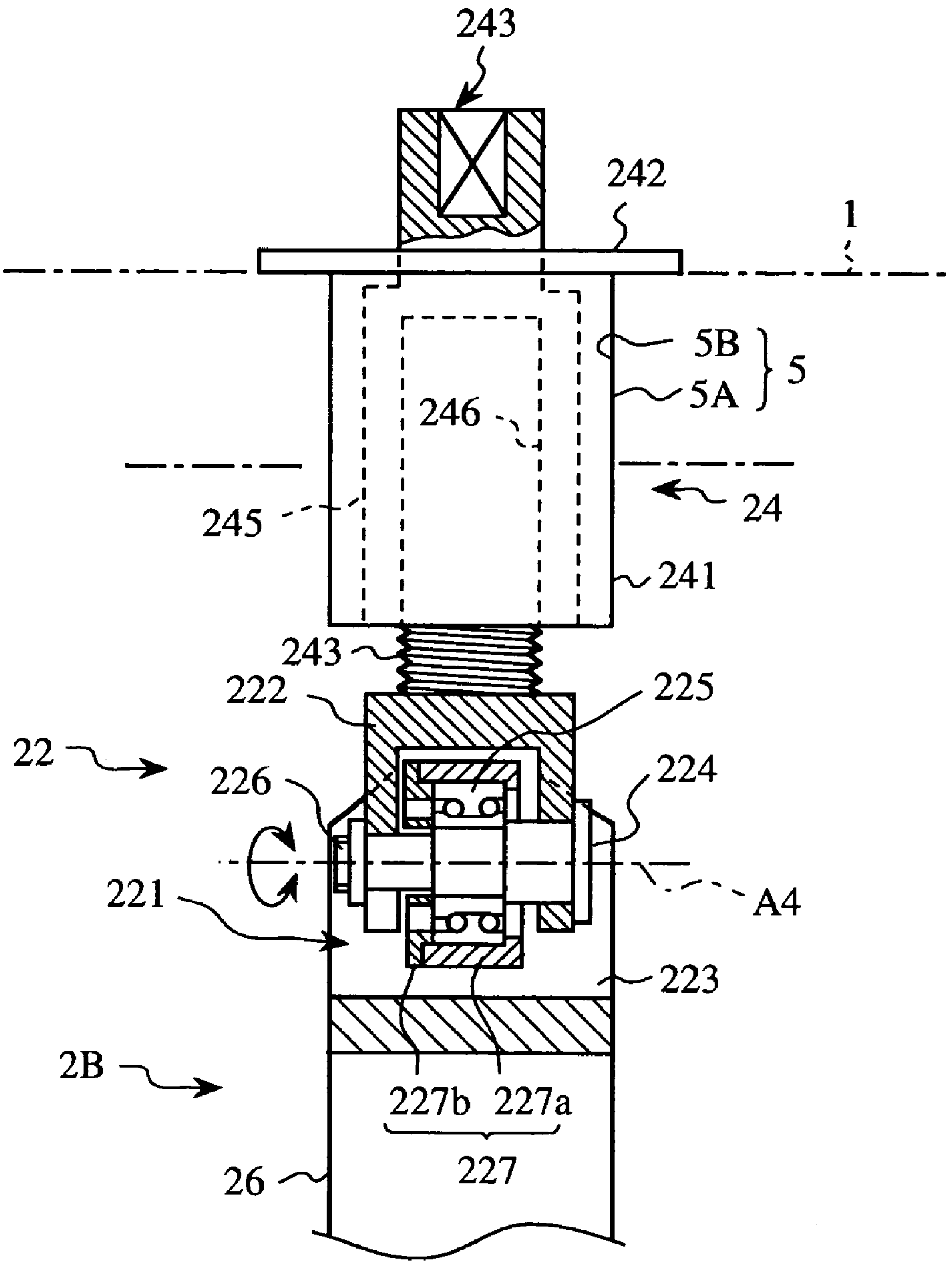
FIG. 5 is a partial front view showing a detailed branch section (apart of which is shown by dotted lines) of the reflecting mirror support structure shown in FIG. 1.

FIG. 5 shows the second position adjusting mechanism 24 in detail. In FIG. 5, reference number 241 designates an anchor, 242 denotes a flange of the anchor 241, 243 indicates a main pole, 244 indicates a driving hole, 245 denotes a rotor, and 246 designates a hole of the rotor 245.

The second position adjusting mechanism 24 shown in FIG. 5 basically has the same structure and function of that of the first position adjusting mechanism 23 shown in FIG. 1.

The difference between them is that the second position adjusting mechanism 24 is mounted on the reflecting mirror panel 1. The second position adjusting mechanism 24, namely, the second height adjusting mechanism is placed at the branch section 2B corresponding to the mount position 5 shown in FIG. 2. In addition, the same second position adjusting mechanism 24 is also mounted on the other mount positions 6 and 7 of the reflecting mirror support member 2 to the reflecting mirror panel 1. The second position adjusting mechanism 24 has the anchor 241, the rotor 245 placed in the hole of the anchor 241, and the main pole 243 which is engaged with the rotor 245 so as to shift it upward and downward.

The anchor 241 has the upper section 5A of the reflecting mirror support member 2 inserted into the penetrate hole 5B of the reflecting mirror panel 1 in order to fix it at the penetrate hole 5B. Because the upper section 5A is contacted to the upper surface of the reflecting mirror panel 1 when inserted through the penetrate hole 5B, the flange 242 expanded at the upper section of the anchor 241 radially acts as a stopper to prevent that the anchor 241 falls down from the reflecting mirror plate 1.

By the way, because the anchor 214 is fixed to the reflecting mirror panel 1 by means other than the flange 242, both the anchor 241 and the reflecting mirror panel 1 are shifted together when the branch section 2B is expanded according to the operation of the second position adjusting mechanism 24.

The hole is formed in the middle part of the anchor 241. The rotor 245 is placed in this hole, so that the rotor 245 can rotate about its vertically central axis. The rotor 245 has the internal hole 246 formed in its vertical direction. A female screw is formed around the inner surface of the internal hole 246. A male screw is formed at the outer surface of the main pole 243. The main pole 243 is engaged with the inner hole 246 of the rotor 245 by those screws. By rotating the rotor 245 against the anchor 241 about the common axis in the vertical direction of the main pole 243 and the rotor 245, the main pole 243 can be moved upward and downward. In other words, the branch section 2B is expanded according to the rotation of the main pole 243, and both the anchor 241 and the reflecting mirror panel 1 are shifted upward and downward.

The upper end of the rotor 245 projects toward the upper direction from the anchor 241 and the reflecting mirror panel 1. The driving hole 244 is formed in the upper surface of the rotor 245.

The tool 30 shown in FIG. 2 is inserted into the driving hole 244 in order to rotate the main pole 243 about its axis. Accordingly, an operator can adjust the length of each branch section 2B using the action of the screw in order to adjust the height of each of the mount positions 5, 6, and 7.

Figure 6:
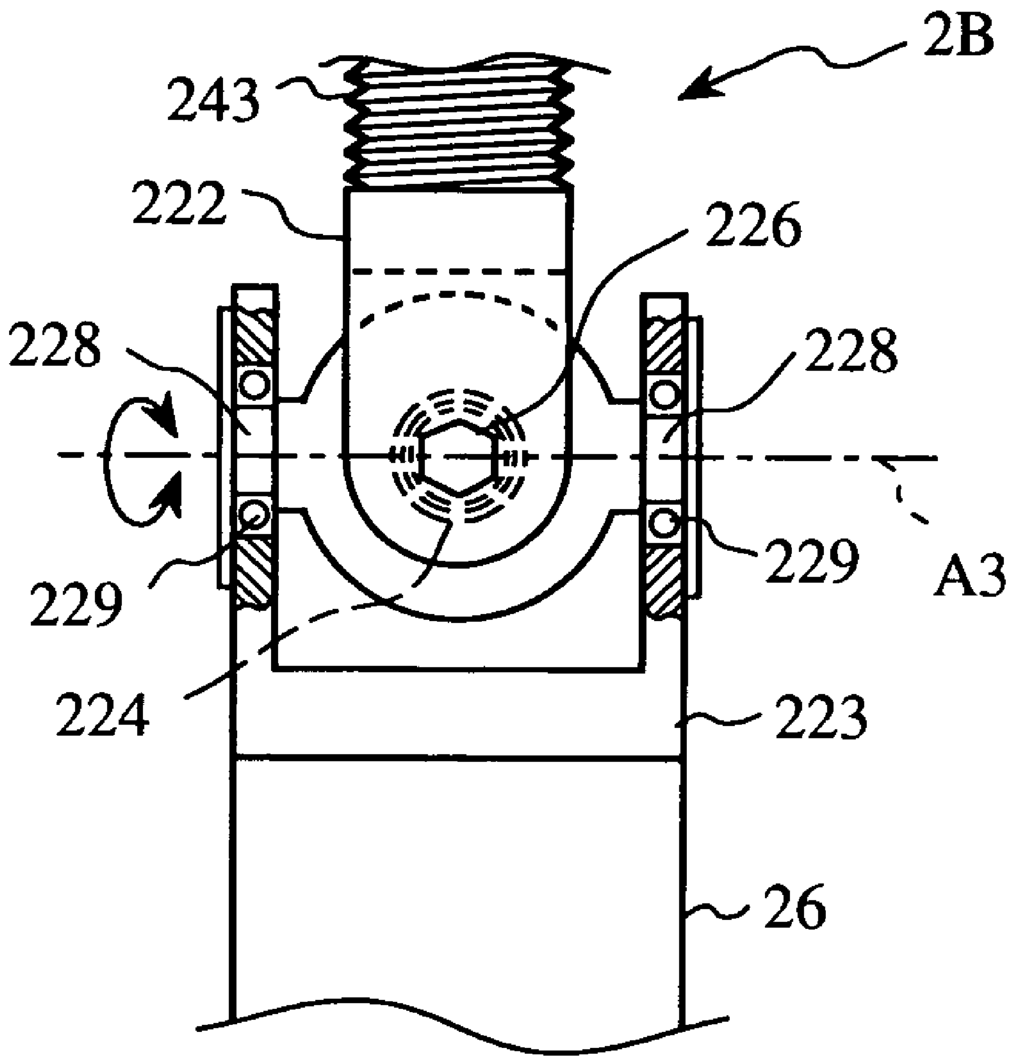
FIG. 6 is a side view of the structure shown in FIG. 5.

FIG. 5 and FIG. 6 show the second displacement allowable member 22 in detail. The second displacement allowable member 22 is basically in substance the same of the first displacement allowable member 21 shown in FIG. 3 and FIG. 4. In FIG. 5 and FIG. 6, reference number 221 designates a universal joint, 222 denotes a second bracket, and 223 indicates a first bracket. Reference number 224 indicates a second axis, 225 denotes a second bearing, 226 designates an axis fixing bolt, and 227 denotes a bearing case assembly. Reference characters 227*a* and 227*b* designate case members, reference number 228 indicates a first axis, and 229 denotes a first bearing.

The second displacement allowable member 22 shown in FIG. 5 and FIG. 6 allows to incline the upper part (as the second position adjusting mechanism 24) to the lower part 26 of the branch section 2B according to the magnitude of an external force using the action of the universal joint 221 after the reflecting mirror panel 1 is set. In a concrete example, the second displacement allowable member 22 has the universal joint 221, and both the brackets 222 and 223 mounted on the universal joint 221.

The first bracket 223 placed at the lower section of the universal joint 221 is placed at the upper section of the lower section 26 of the branch section 2B. As shown in FIG. 6, the first bracket 223 has a top plate and two side plates. The top plate is placed at the upper side of the lower section 26 of the branch section 2B and the side plates extend from this top plate toward the lower direction. The top plate and the side plates are assembled in one body.

The first bearing 229 is mounted to each side plate of the first bracket 223. A pair of the first axis 228 of the bearing case assembly 227 are supported rotatably by the first bearing 229. A pair of the first axes 228 is extended from both the sides of the bearing case assembly 227 to outside.

The first axis 228 is fixed to the bearing case assembly 217 or is made in one body.

Those first axes 228 have a common central axis line A3. Accordingly, it is possible to rotate the bearing case assembly 227 about the central axis line A3 to the first bearing 229 and the first bracket 223.

The second bracket 222 placed at the upper side of the universal joint 221 is placed in the lower side of the mail pole 243 of the second position adjusting mechanism 24. As shown in FIG. 5, the second bracket 222 has the top plate and the side plates. The top plate is placed at the lower end of the main pole 243 and the side plates extend from both sides of the top plate toward the lower direction. The top plate and the side plates are assembled in one body.

The side plates of the second bracket 222 is engaged with the second axis 224. One end of the second axis 224 has a flange and other end thereof has a male screw (not shown). The flange is placed outside of one side plate, and is inserted into a hole formed in both the side plates, and the axis fixing bolt 226 is engaged with the male screw. By this manner, the second axis 224 is fixed to the second bracket 222 so as not to rotate them together.

The middle part of the second axis 224 is inserted to the second bearing 225, and the second bearing 225 can rotate about the fixed second axis 224. The second bearing 225 is accommodated in the bearing case assembly 227 made up of the case members 227*a* and 227*b*, and fixed to the bearing case assembly 227. Accordingly, the second axis 224 can rotate with the first bracket 222 about the central axis line A4 of the second axis 224 to the fixed second axis 225 and the bearing case assembly 227.

The direction toward which the central axis line A4 is extended is intersected at right angles to the extended direction (see FIG. 6) of the axis line A3.

As apparently understood by the above explanation, the universal joint 221 is made up of the second axis 224, the second bearing 225, the bearing case assembly 227, the first axis 228, and the first bearing 229.

The first bracket 222 and the main pole 243 of the second position adjusting mechanism 24 can incline in all directions by using the universal joint 221.

As not shown, it is preferred to have a mechanism to suppress an excessively relative rotation between the configuration elements forming the universal joint 221.

Next, a description will now be given of the operation of the reflecting mirror support mechanism.

As described above, because the first length adjusting mechanism, namely, the first position adjusting mechanism 23 is placed, the operator can perform the expansion and contraction adjustment in the axis line direction of the base section 2A using the tool 30 after the reflecting mirror support members 2A and further the reflecting mirror panel 1 is mounted. By adjusting the length of the base section 2A, the operator can adjust all the positions (concretely, the heights thereof) of the branch sections 2B collectively to the support base 3, even if the reflecting mirror support mechanism has been mounted. This can contribute to perform the rough adjustment for the position and the shape of the reflecting mirror panel 1.

Furthermore, it is possible for the operator to perform the adjustment of the expansion and contraction in an approximately vertical direction of each branch section 2B using the tool 30 after the mounting of the reflecting mirror panel 1. Thus, even if the assembly of the reflecting mirror support structure has been completed it is possible to adjust the upper sections 5A, 6A, and 7A of each branch section 2B and each mount position 5, 6, and 7 (concretely, the height of each position) by adjusting the length of the branch section 2B. This contributes the fine adjustment of the shape of the reflecting mirror panel.

Still furthermore, because the first displacement allowable member 21 is placed, the branch sections 2B can change collectively according to the amount of a strain by the first displacement allowable member 21 placed in the base section 2A even if a large strain occurs in a wide range in the reflecting mirror panel 1 after the reflecting mirror support member 2 and further the reflecting mirror panel 1 are mounted. Accordingly, the first displacement allowable member 21 can suppress any increasing of the strain occurred in the reflecting mirror panel 1 in a wide range after the completion of the assembly of the reflecting mirror support mechanism.

Still furthermore, because the second displacement allowable member 22 is mounted, the mount positions 5, 6, and 7 can change their position independently according to the magnitude of a local strain even if this local strain occurs in the reflecting mirror panel 1 after the reflecting mirror support members 2 and the reflecting mirror panels 1 have been mounted. Accordingly, it is possible to suppress any increasing of the local strain occurred in the reflecting mirror panel 1 by the second displacement allowable member 22 after the a assembly of the reflecting mirror support structure.

Next, a description will now be given of the efficiently adjustment operation suitable for the reflecting mirror support structure according to the first embodiment. As has been mentioned above, the operator can perform each of the first position adjusting mechanism 23 and the second position adjusting mechanism 24 independently only using the tool 30. However, it is further possible to increase the efficiency of the adjustment work using the following manner.

Figure 7:
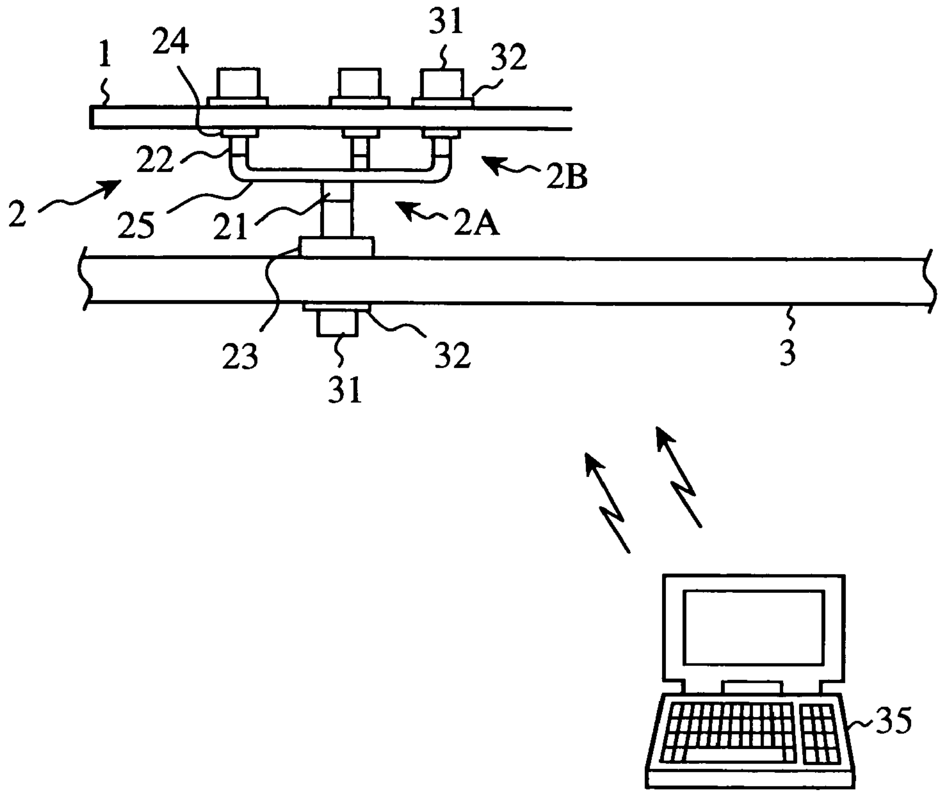
FIG. 7 is a side view showing the reflecting mirror support structure in a first stage in an adjusting method suitable for the reflecting mirror support structure shown in FIG. 1.

FIG. 7 is a side view showing the reflecting mirror support structure in a first stage of the adjusting method suitable for the reflecting mirror support structure shown in FIG. 1. In FIG. 7, reference number 31 designates an operation device, 32 denotes a mounting mechanism, and 35 indicates a personal computer (a remote controller).

In this adjustment method, a plurality of operation devices 31 which operate the first position adjusting mechanism 23 and the second position adjusting mechanism 24 are mounted on the reflecting mirror support structure by the mount mechanism 32.

Although the figure does not show any detailed structure, the operation device 31 has a battery (for example, a secondary battery) as a power source of the operation device 31 and a radio circuit. When receiving a radio signal using an electromagnetic (for example, an infrared ray), the radio circuit starts and drives the electric screw driver by responding this radio signal.

The mount mechanism 32 is a tool to temporarily fit both materials together, such as a magnet, a tape, a clamp, a screw, and other tool. The operation device 31 is mounted to the reflecting mirror panel 1 or the support base 3 by the mount mechanism 32 under the state where the chip of the electric screw driver is coupled to the driving holes 234 and 244.

Because the computer 35 transmits the operation instruction signal to the radio circuit in the operation device 31 using the radio wave based on the electromagnetic wave, the computer 35 has a communication function (for example, an infrared communication function).

A memory device in the computer 35 has stored various files in which operation values to be operated for all the position adjusting mechanisms 23 and 24 are written. Other kinds of the remote controllers can achieve the function of the computer 35. This function of the computer 35 will be described later. Further, the feature of the present invention is not limited by this manner. For example, the present invention can be achieved by other devices not using any computer system.

When the mounting of each operation device 31 to the reflecting mirror support structure is completed, the operator instructs the computer 35 to transmit the operation start signal to each operation device 31. This operation start signal is generated based on the files, in which the operation values are written, stored in the computer 35. The operation signal indicates the operation values to operate all the position adjusting mechanisms.

When receiving the operation instruction signal, the radio circuit 31 in each operation device distinguishes and selects the instructions for the position adjusting mechanisms 23 and 24 from the operation instruction signal, and initiates the screw driver therein based on the selected instructions. Each operation device 31 controls the operation of the corresponding position adjusting mechanism 23 or 24 based on the operation value indicated. When the mechanism 23 or 24 is driven based on the predetermined operation value, the radio circuit in the operation device 31 stops the rotation of the screw driver. Thus, the position adjustment of the rough position of the reflecting mirror support member 2 and the mount positions 5, 6, and 7 to the reflecting mirror panel 1 in each branch section 2B are completed. After this adjustment, the operation device 31 is released from the reflecting mirror support mechanism by releasing the mount mechanism 32.

As described above, according to the first embodiment, because a plurality of the branch sections 2B are mounted per reflecting mirror panel 1, it is possible to support the reflecting mirror panel 1 with high accuracy and high structural stability. In addition, because the single base section 2A of the reflecting mirror support member 2 is formed for a plurality of the branch sections 2B, it is possible for the operator to perform the fine adjustment for the shape of the reflecting mirror panel 1 with simple work. Further, because it is possible to decrease the number of the mount positions when compared with the conventional one, the manufacturing cost can be decreased. Still further, because it is possible to perform the fine adjustment for the shape of the reflecting mirror panel 1, the manufacturing accuracy for the reflecting mirror panel 1 can be reduced. This can decrease the manufacturing cost.

Furthermore, because the number of the branch sections 2B of the reflecting mirror support member 2 is three, one reflecting mirror support member 2 can support the reflecting mirror panel 1 at the three positions. This can increase the structural stability.

Still furthermore, this reflecting mirror support structure has the three reflecting mirror support members 2 which support one reflecting mirror panel 1. Thereby, the reflecting mirror panel 1 is supported at a plurality of the branch sections 2B, it is possible to easily increase the structural accuracy of the reflecting mirror panel 1. This can allow the execution of the fine adjustment of the shape with high accuracy. In another aspect, even if the size of the reflecting mirror panel 1 is large, it is possible to maintain the accuracy in shape. On the other hand, those branch sections 2B are finally supported by the base section 2A of each of the three reflecting mirror support members 2. Accordingly, the entire load of the reflecting mirror panel 1 is supported at the three positions. This can provide the stable structure without collapse.

Moreover, it is possible to roughly and together adjust the positions of all the branch sections 2B to the support base 3 using the first position adjusting mechanism 23 mounted on the base section 2A. This contributes the rough adjustment of the position and the shape of the reflecting mirror panel 1. Further, using the second position adjusting mechanism mounted in each branch section 2B, it is possible to perform the fine adjustment for each mount position 5, 6, and 7 independently to the reflecting mirror panel 1 corresponding to the branch section 2B. This contributes the fine adjustment of the shape of the reflecting mirror panel 1. By performing those adjustments of two stages, it is possible to increase the efficiency of the entire adjustment work.

Still further, even if a large strain in a wide range occurs in the reflecting mirror panel 1, it is possible to change the branch sections 2B to the support base 3 collectively. Accordingly, it is thereby possible to suppress any increasing of the strain in a wide range of the reflecting mirror panel 1 after the assembly of the reflecting mirror support mechanism.

In addition, the second displacement allowable member 22 placed in each branch section 2B changes in height each of the mount positions 5, 6, and 7 of the corresponding branch section 2B to the reflecting mirror panel 1 independently. That is, the second displacement allowable member 22 can perform a local change in position of the reflecting mirror panel 1.

Further, because each of the first displacement allowable member 21 and the second displacement allowable member 22 has the universal joint, the reflecting mirror support member 2 can incline in a wide range to the support base 3 by the first displacement allowable member 22.

Each of the mount positions 5, 6, and 7 of each branch section 2B to the reflecting mirror panel 1 can change in height toward a wide range by the second displacement allowable member 23.

Furthermore, according to the efficiently adjustment method described above, because a plurality of the operation devices 31 are fixed to the reflecting mirror support structure by a plurality of the mount mechanisms 32, it is possible to easily operate the first and second position adjusting mechanisms 23 and 24. Finally, because the mount mechanism 32 is released so as to separate the operation devices 31 from the reflecting mirror structure, it is possible to eliminate the load of them to be given to the reflecting mirror support structure. This can increase the durable life thereof.

Moreover, the operation of each operation device 31 is initiated automatically when receiving the operation instruction signal based on the electromagnetic wave transmitted from the computer 35, it is not necessary to use any signal wire to transmit this control signal to drive the operation device 31. This can reduce the load to be given to the reflecting mirror support structure.

In addition, the operation instruction signal indicates the operation value to operate the first and second position adjusting mechanisms 23 and 24. According to the operation value specified, each operation device 31 operates the corresponding first and second position adjusting mechanisms 23 and 24. Thereby, the operation device 31 can operate automatically, and it is thereby possible to perform the adjustment of the reflecting mirror panel 1 efficiently.

Second Embodiment

Figure 8:
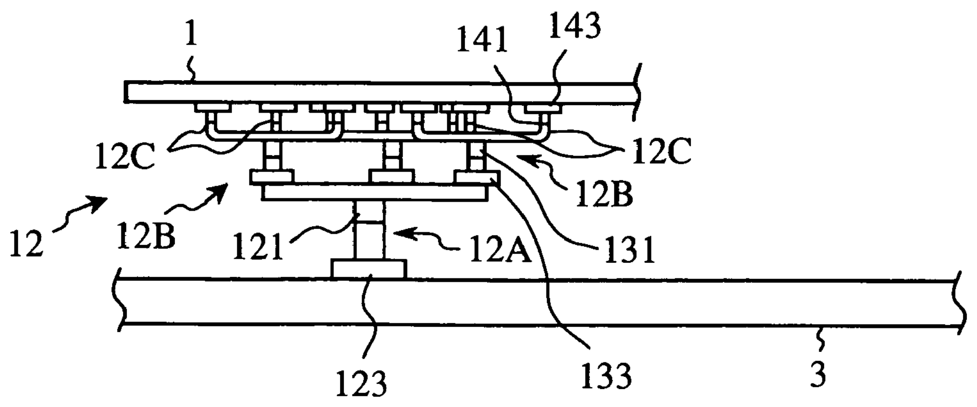
FIG. 8 is a side view showing the reflecting mirror support structure according to a second embodiment of the present invention.

FIG. 8 is a side view showing the reflecting mirror support structure according to a second embodiment of the present invention. In FIG. 8, reference number 12 designates a reflecting mirror support member, reference character 12A denotes a base section, 12B indicates a first branch section, and 12C designates a second branch section. Reference number 121 designates a displacement allowable member in the branch section, 123 denotes a position adjusting mechanism in the branch section, 131 indicates a displacement allowable member in the branch section, 133 indicates a position adjusting mechanism in the branch section, 144 designates a displacement allowable member in the branch section, and 143 indicates a position adjusting mechanism in the branch section.

A difference between the first and second embodiments, the first reflecting mirror support member of the first embodiment is replaced with the reflecting mirror support member 12. The reflecting mirror panel 1 and the support base 3 are the same of those in the first embodiment. Therefore, the explanation for the same components is omitted here.

In FIG. 8, only the single reflecting mirror support member 12 is shown. As shown in FIG. 8, the scope of the present invention includes the embodiment in which the single reflecting mirror support member 12 supports the single reflecting mirror panel. It is preferred that one reflecting mirror panel 1 is supported by a plurality of the reflecting mirror support members 12, in particular, it is more preferred that one reflecting mirror panel 1 is supported by the three reflecting mirror support members 12. The plate support member, that is, the reflecting mirror support member 12 has the tree structure having the branch sections of plural stages. In a concrete example, the reflecting mirror support member 12 has the base section 12A whose lower section is mounted to the support base 3. The three first branch sections 12B are mounted on the upper part of the base section 12A.

The three second branch sections 12C are mounted on the upper section of each first branch section 12B. The upper end of each second branch section 12C is mounted to the reflecting mirror panel 1. Accordingly, the load of the reflecting mirror panel 1 as the target body to be supported is transmitted to the nine second branch sections 12C at the uppermost stage at first. Following, the load is transmitted to the three first branch sections 12B in the middle stage. The load is transmitted to the single base section 12A at the lowermost stage. Finally, the load is then transmitted to the support base 3.

It is acceptable that the mount structure between the base section 12A and the support base 3 is the same of the mount structure between the base section 2A and the support base 3 in the first embodiment shown in FIG. 2 and FIG. 3.

Further, it is also acceptable that both the mount structures between the base section 12A and the first branch section 12B and between the first branch section 12B and the second branch section 12C are the same of the mount structures between the base section 2A and the branch section 2B in the first embodiment shown in FIG. 3 and FIG. 4.

It is further acceptable that the mount structure between the second branch section 12C in the uppermost stage and the reflecting mirror panel 1 is the same of the mount structure between the branch section 2B and the reflecting mirror panel 1 in the first embodiment shown in FIG. 5 and FIG. 6.

In the reflecting mirror support member 12, the base section 12A has the position adjusting mechanism (as a first position adjusting mechanism) 123 of the base section in order to adjust the positions of all the branch sections 12B and 12C to the support base 3. It is acceptable that this position adjusting mechanism 123 has the same structure of the first position adjusting mechanism 35 according to the first embodiment shown in FIG. 3. Accordingly, the position adjusting mechanism 123 in the base section acts as the length adjusting mechanism in the base section to adjust the length of the base section 12A, it also acts as the height adjusting mechanism in the base section in order to adjust the heights of the members placed at the upper section of the base section 12A.

Similarly, each of a plurality of the first branch sections 12B and a plurality of the second branch sections 12C has the position adjusting mechanism (second position adjusting mechanism) 133 in the branch section in order to adjust the mount position to the configuration element placed at the upper section for each branch section.

It is acceptable that the position adjusting mechanism in the branch section 133 or 143 has the same or similar structure of the second position adjusting mechanism 24 of the first embodiment shown in FIG. 5. That is, the position adjusting mechanism in the branch section 133 or 143 is the length adjusting mechanism in the branch section to adjust the length of the corresponding branch sections 12B and 12C, and also acts as the height adjusting mechanism in the branch section to collectively adjust the heights of the members in the upper side of the branch sections 12B and 12C.

Still further, the base section 12A has the displacement allowable member 121 to allow the entire displacement of all the branch sections 12B and 12C according to the magnitude of the external force. It is acceptable that the displacement allowable member 121 in the base section has the same structure of the first displacement allowable member 21 according to the first embodiment shown in FIG. 3 and FIG. 4. That is, all the branch sections 12B and 12C, namely, the reflecting mirror panel 1 can be changed in position, height, and length collectively in all directions by the universal joint.

Still furthermore, each of a plurality of the branch sections 12B and 12C has the displacement allowable members 131 and 141 to allow the displacement of the mount position to the configuration elements in the upper side of each branch section according to the magnitude of the external force. It is acceptable that the displacement allowable members 131 and 141 in the branch section has the same or similar structure of the second displacement allowable member 22 according to the first embodiment shown in FIG. 5 and FIG. 6. That is, each mount position to the upper elements corresponding to the branch sections 12B and 12C can be changed in all directions by the universal joint.

Figure 9:
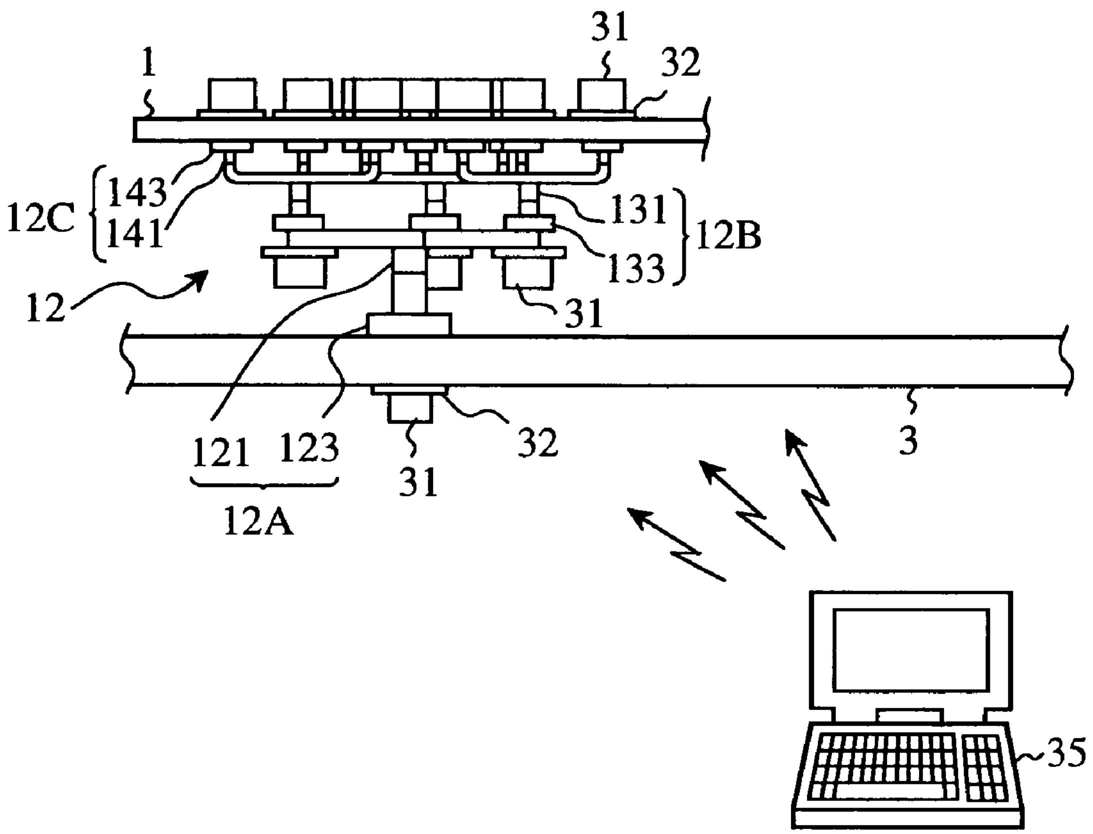
FIG. 9 is a side view showing the reflecting mirror support structure in a first stage in an adjusting method suitable for the reflecting mirror support structure shown in FIG. 8.

FIG. 9 is a side view showing the reflecting mirror support structure in the first stage of the adjusting method suitable for the second embodiment. In the second embodiment, it is possible for the operator to adjust each of the position adjusting mechanisms 123, 133, and 143 independently by using the tool 30. However, by using the method shown in FIG. 9 it is possible to achieve the increasing of the efficiency of the adjusting work very rapidly.

The operation devices 31, the mount mechanisms 32, and the computer 35 shown in FIG. 9 have the same structure of those shown in FIG. 7. In this adjusting method, firstly, a plurality of the operation devices 31 are fixed to the reflecting mirror support mechanism by each mount mechanism 32. Each operation device 31 operates the corresponding position adjusting mechanism 123 and position adjusting mechanisms 133 and 143.

Next, like the manner of the first embodiment, the operator operates the computer 35 so that the operation instruction signal of a radio wave using the electromagnetic wave is transmitted to the radio circuit in the operation device 31. The position of the entire of the reflecting mirror support members 12 and the position of each of the branch sections 12B and 12C are adjusted by the position adjusting mechanisms 123, 133, and 143 controlled by each operation device 31. Finally, the mount mechanism 32 is released and the operation devices 31 are thereby detached from the reflecting mirror mechanism.

As described above, according to the second embodiment, it is possible to obtain the same effect of the first embodiment. In addition, it is possible to mount a plurality of the branch sections 12C to one base section 12A, and to easily support each reflecting mirror panel 1 by a plurality of the branch sections 12C. This can achieve to perform the fine adjustment with high accuracy. Furthermore, because a plurality of the branch sections 12C are formed and the single base section 12A is used in the reflecting mirror support member, it is possible for the operator to perform the fine adjustment for the shape of the reflecting mirror panel 1 with lower work.

In addition, the number of the first branch sections 12B is three, and the number of the branch sections 12C branched from each first branch section 12B is also three. Therefore the load of the reflecting mirror panel 1 can be supported by the three supporting points, that is, the three second branch sections 12C per first branch section 12B. This can increase in structure the stability of the reflecting mirror support mechanism.

On the other hand, a plurality of the second branch sections 12C are supported by the three first branch sections 12B. Accordingly, the entire load of the upper part of the base section 12A is supported by the three supporting points. This structure of the second embodiment can provide the stable structure without collapse.

In addition, it is possible to roughly adjust the positions of all the branch sections 12B and 12C collectively to the support base 1 using the position adjusting mechanism 123 mounted in the base section 12A. Further, it is possible to perform the fine adjustment for each of the corresponding branch sections 12B and 12C independently using the position adjusting mechanisms 133 and 143 mounted in each of the branch sections 12B and 12C. By performing such a step-by-step adjustment operation, it is possible to increase the efficiency of the entire adjustment work.

Still further, even if a large strain occurs in the reflecting mirror panel 1, it is possible to change all the branch sections 12B and 12C collectively by the displacement allowable member 121 mounted in the base section 12A. Moreover, it is possible to change each of the corresponding displacement allowable members 12B and 12C independently by the displacement allowable members 131 and 141 mounted in each of the branch sections 12B and 12C.

In addition, according to the effectively adjusting method described above shown in FIG. 8 it is possible to obtain the same effect of the first embodiment.

The preferred embodiments of the present invention are described above with reference to the figures. While the above provides a full and complete disclosure of the preferred embodiments of the present invention, the inventors intend that a person having a skill of this art can easily consider that various modifications, alternate constructions and equivalents may be employed without departing from the scope of the invention. Therefore the above description and illustration should not be construed as limiting the scope of the invention, which is defined by the appended claims.

For example, as shown in FIG. 8, in the second embodiment, the reflecting mirror support member 12 has a tree structure having the branch sections 12B and 12C in the two stages. The present invention is not limited by this structure, for example, it is possible to mount the reflecting mirror support member having the branch section in not less than three stages. In this case, although the number of the mount positions to the reflecting mirror panel 1 is increased, it is possible to adjust the shape of the reflecting mirror panel 1 with more high accuracy.

Furthermore, the present invention is not limited by the structure in which each of the displacement allowable members 21, 22, 121, 131, and 141 is the universal joint relating to the hook joint. Instead of the universal ball joint and the universal ball joint, it is possible to use an adequate mechanism to allow the displacement in all directions as the displacement allowable member.

In the embodiments described above, the position adjusting mechanism 23, 24, 123, and 143 are mounted on the reflecting mirror support member 2 or 12. However, it is possible to obtain the same effect when they are mounted on the reflecting mirror panel 1 and the support base 3 instead of the reflecting mirror support member.

Still furthermore, although the branch sections 12B and 12C have the position adjusting mechanisms 133 and 143, respectively, it is possible to eliminate one of the group of the position adjusting mechanisms 133 and the group of the position adjusting mechanisms 143.

In the embodiments described above, the operator operates the position adjusting mechanisms 23, 24, 123, 133, and 143 using the tool 30 other than the reflecting mirror support structure. However, the driving devices (for example, an electric motor, an oil motor, and an oil cylinder) to drive the mechanisms 23, 24, 123, 133, and 143 can be mounted permanently on a proper position in the reflecting mirror support structure.

In the embodiments described above, the number of the branch sections 2B per reflecting mirror support member 2 is three, the number of the first branch sections 12B per reflecting mirror support member 12 is three, and the number of the second branch sections 12C per first branch section 12B is also three. However, the present invention is not limited by this structure, it is acceptable that the number of the branch sections is not les than two. For example, when a plurality of the reflecting mirror support members 2 support one reflecting mirror panel 1, it is acceptable that the number of the branch sections 2B in each reflecting mirror support member 2 is two.

Moreover, there is a possibility to have the structure in which the four or more branch sections 2B are mounted according to the interval of the mount positions to the reflecting mirror panel 1 and the rigidity of the reflecting mirror panel 1.

Further, in a case where one reflecting mirror panel 1 is supported by a plurality of the reflecting mirror support members shown in FIG. 1, it is not necessary to use the same kind of the reflecting mirror support member 2. For example, it is acceptable that both the reflecting mirror support member 2 of the first embodiment and the reflecting mirror support member 12 of the second embodiment support the same reflecting mirror panel 1.

Figure 10:
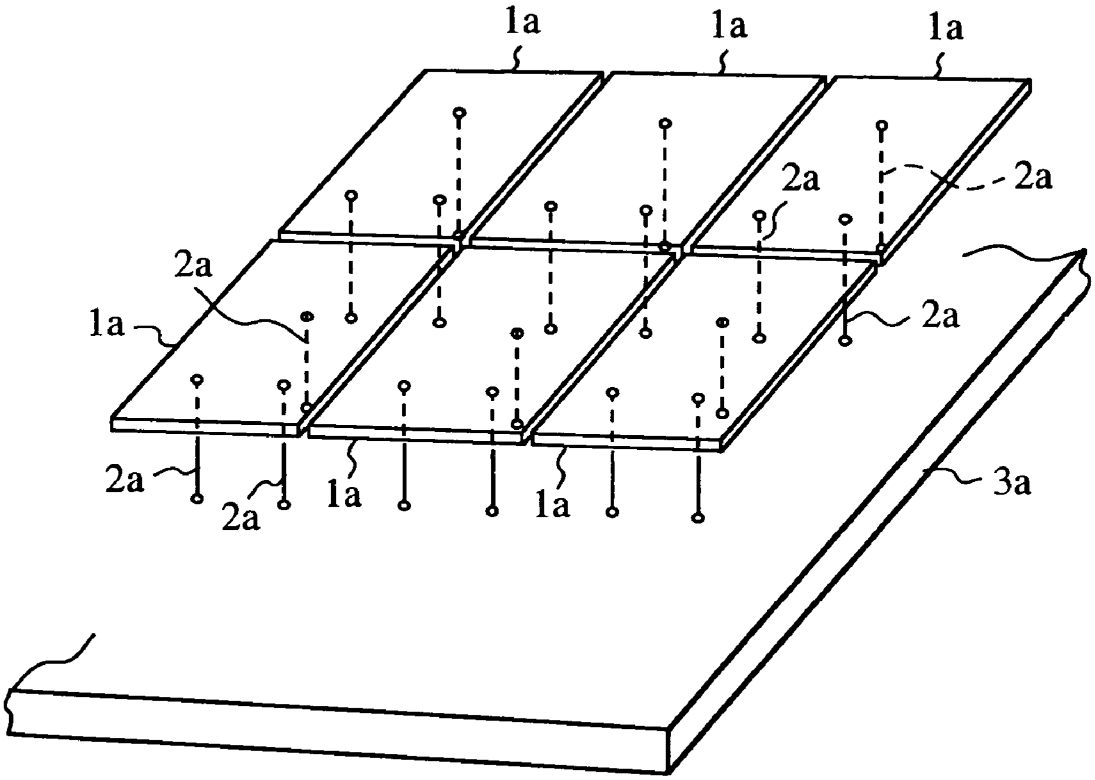
FIG. 10 is a perspective view showing an example of a conventional reflecting mirror support structure.
Figure 11:
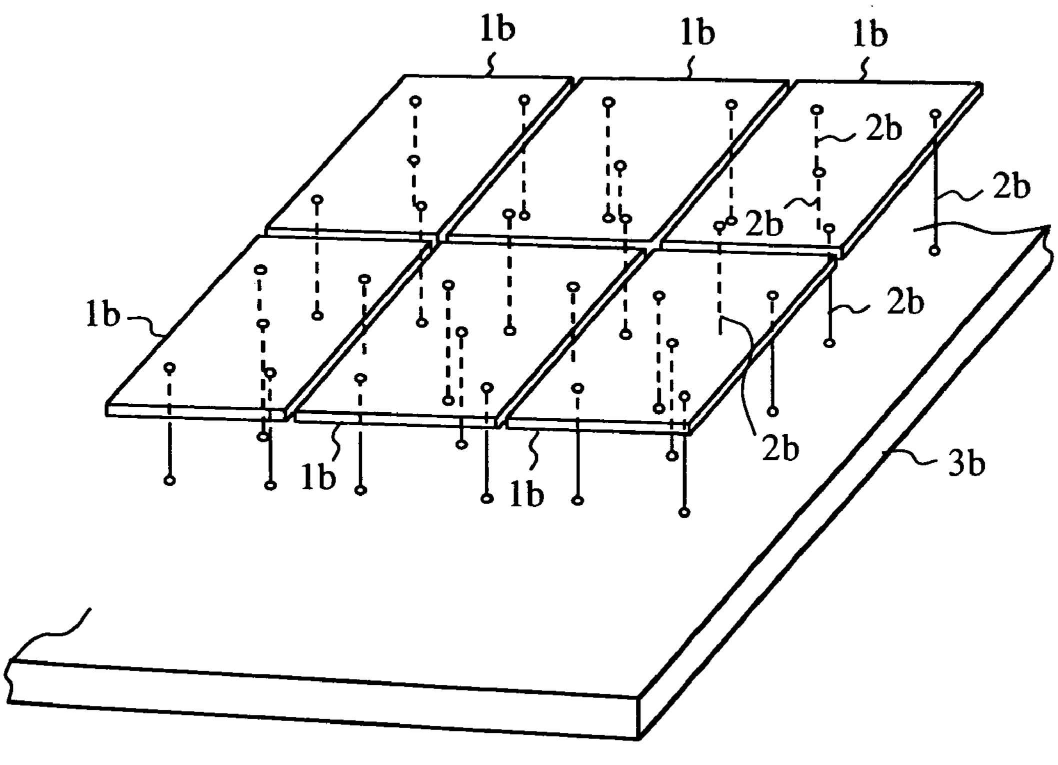
FIG. 11 is a perspective view showing another example of the conventional reflecting mirror support structure.

Still further, the inventors intent the scope of the present invention includes the case in which a combination of one or both the reflecting mirror support members 2 and 12 and the conventional reflecting mirror support member having one mount position in the upper side connected to the panel 1 (see FIG. 10 and FIG. 11) supports the same reflecting mirror panel 1.

Still furthermore, the present invention can be applied to the case having a structure where the reflecting mirror is made up of a single reflecting mirror panel, instead of the case where the reflecting mirror has a plurality of the reflecting mirror panels.

Furthermore, it is acceptable that the present invention is applied to a support structure in which a reflecting mirror is made up of only a single reflecting mirror panel, in addition to the support structure to support a plurality of reflecting mirror panels for a reflecting mirror.

INDUSTRIAL APPLICABILITY

As described, according to the reflecting mirror support structure of the present invention, it is possible to support the reflecting mirror panel with high structural stability and with high accuracy, and to perform the fine adjustment for the shape of the reflecting mirror panel with low working amount for adjustment. In addition, according to the adjustment method of the reflecting mirror support structure of the present invention, it is possible to adjust the reflecting mirror support mechanism efficiently.

What is claimed is:

1. A reflecting mirror support mechanism comprising:

a support base configured to support a first reflecting mirror panel and a second reflecting mirror panel;

at least three first reflecting mirror support members configured to be provided between the first reflecting mirror panel and said support base for supporting the first reflecting mirror panel; and at least three second reflecting mirror support members configured to be provided between the second reflecting mirror panel and said support base for supporting the second reflecting mirror panel, wherein said first and said second reflecting mirror support members each include a base section mounted on said support base and a plurality of branch sections configured to be mounted to a respective reflecting mirror panel.

2. A reflecting mirror support mechanism comprising:

a support base for supporting at least one reflecting mirror panel; and at least one reflecting mirror support member placed between the at least one reflecting mirror panel and the support base for supporting the at least one reflecting mirror panel, wherein:

each of the at least one reflecting mirror support member is made up of a base section mounted on the support base and a plurality of branch sections mounted to one of the at least one reflecting mirror panel;

the at least one of the at least one reflecting mirror panel is supported by at least three reflecting mirror support members; and the number of branch sections of each of the at least one reflecting mirror support member is three.

3. A reflecting mirror support mechanism comprising:

a support base for supporting at least one reflecting mirror panel; and at least one reflecting mirror support member placed between the at least one reflecting mirror panel and the support base for supporting the at least one reflecting mirror panel, wherein:

each of the at least one reflecting mirror support member is made up of a base section mounted on the support base and a plurality of branch sections mounted to one of the at least one reflecting mirror panel;

the at least one of the at least one reflecting mirror panel is supported by at least three reflecting mirror support members;

a first position adjusting mechanism for adjusting to the support base a position of a group of the branch sections in the at least one reflecting mirror support member is formed in the base section of the at least one reflecting mirror support member or the support base; and a plurality of second position adjusting mechanisms for adjusting a mount position of each branch section to the at least one reflecting mirror panel are formed in each of a plurality of the branch sections of the at least one reflecting mirror support member or the at least one reflecting mirror panel.

4. An adjusting method of adjusting the reflecting mirror support mechanism according to claim 3, comprising:

fixing a plurality of operation devices to operate a first position adjustment mechanism and a second position adjustment mechanism in the reflecting mirror support mechanism by a mounting mechanism;

adjusting a position of a reflecting mirror support member and a mount position of each branch section to the at least one reflecting mirror panel by operating the first and second position adjusting mechanisms by driving each operation device; and removing the operation devices from the reflecting mirror support mechanism by detaching the mount mechanism.

5. The adjusting method of adjusting the reflecting mirror support mechanism according to claim 4, wherein:

operating each operation device is automatically initiated by receiving an operation instruction signal of an electromagnetic wave transmitted from a remote controller.

6. The adjusting method of adjusting the reflecting mirror support mechanism according to claim 5, wherein:

the operation instruction signal indicates an amount of operation to the first and second position adjusting mechanisms; and one of the first and second position adjusting mechanisms is driven according to the amount of the instructed operation by each operation device.

7. A reflecting mirror support mechanism comprising:

a support base for supporting at least one reflecting mirror panel; and at least one reflecting mirror support member placed between the at least one reflecting mirror panel and the support base for supporting the at least one reflecting mirror panel, wherein:

each of the at least one reflecting mirror support member is made up of a base section mounted on the support base and a plurality of branch sections mounted to one of the at least one reflecting mirror panel;

the at least one of the at least one reflecting mirror panel is supported by at least three reflecting mirror support members; and a displacement allowable mechanism that allows a displacement of the at least one reflecting mirror panel according to an external force applied after placement is formed in the at least one reflecting mirror support member.

8. The reflecting mirror support mechanism according to claim 7, wherein:

the displacement allowable mechanism comprises a first displacement allowable member and a plurality of second displacement allowable members;

the first displacement allowable member is mounted on the base section of the at least one reflecting mirror support member so as to allow the displacement of the group of the branch sections of the at least one reflecting mirror support member to the support base according to the external force; and each of the plurality of second displacement allowable members is mounted on each of a plurality of the branch sections of the at least one reflecting mirror support member so as to allow the displacement of the mount position of each branch section to the at least one reflecting mirror panel according to the external force.

9. The reflecting mirror support mechanism according to claim 8, wherein:

each of the first and second displacement allowable members has a universal joint.

10. A reflecting mirror support mechanism comprising:

a support base for supporting at least one reflecting mirror panel; and at least one reflecting mirror support member placed between the at least one reflecting mirror panel and the support base for supporting the at least one reflecting mirror panel, wherein:

each of the at least one reflecting mirror support member is made up of a base section mounted on the support base and a plurality of branch sections mounted to one of the at least one reflecting mirror panel;

the at least one of the at least one reflecting mirror panel is supported by at least three reflecting mirror support members; and the at least one reflecting mirror support member comprises:

a plurality of first branch sections branched from the base section and a plurality of second branch sections branched from each first branch section; and each second branch section supports an upper load including a load of the at least one reflecting mirror panel.

11. The reflecting mirror support mechanism according to claim 10, wherein:

the number of the first branch sections is three; and the number of the second branch sections branched from each first branch section is three.

12. The reflecting mirror support mechanism according to claim 10, wherein:

a first position adjusting mechanism for adjusting to the support base a position of a group of the branch sections in the at least one reflecting mirror support member is formed in the base section of the at least one reflecting mirror support member or the support base; and a plurality of second position adjusting mechanisms for adjusting a mount position of each of the at least one reflecting mirror support member and the at least one reflecting mirror panel are formed in at least one of a plurality of the first branch sections of the at least one reflecting mirror support member and a plurality of the second branch sections of the at least one reflecting mirror panel.

13. An adjusting method of adjusting the reflecting mirror support mechanism according to claim 12, comprising:

fixing a plurality of operation devices to operate a first position adjustment mechanism and a second position adjustment mechanism to the at least one reflecting mirror support mechanism by a mounting mechanism;

adjusting a position of a reflecting mirror support member and a mount position of the reflecting mirror support member to a reflecting mirror panel by operating the first and second position adjusting mechanism by driving each operation device; and removing the operation devices from the reflecting mirror support mechanism by detaching the mount mechanism.

14. The reflecting mirror support mechanism according to claim 10, wherein:

a base section displacement allowable member allowing a displacement of a group of the branch sections of the at least one reflecting mirror support member to the support base according to an external force is formed in the base section of the at least one reflecting mirror support member; and a branch section displacement allowable member allowing a displacement of a mount position to an upper configuration element of each branch section according to an external force is formed in each of a plurality of the branch sections of the at least one reflecting mirror support member.

* * * * *